United States Patent
Yang

(10) Patent No.: US 9,535,709 B1
(45) Date of Patent: Jan. 3, 2017

(54) BOOTING SYSTEM FOR MOTHERBOARD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Meng-Liang Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/799,729

(22) Filed: Jul. 15, 2015

(30) Foreign Application Priority Data

Jul. 1, 2015 (CN) .......................... 2015 1 0376166

(51) Int. Cl.
G06F 9/00 (2006.01)
G06F 9/24 (2006.01)
G06F 15/177 (2006.01)
G06F 9/44 (2006.01)
G06F 9/445 (2006.01)
G06F 1/26 (2006.01)

(52) U.S. Cl.
CPC ............... G06F 9/4401 (2013.01); G06F 1/26 (2013.01); G06F 9/445 (2013.01)

(58) Field of Classification Search
CPC ........... G06F 9/445; G06F 9/4401; G06F 1/26
USPC ......................................................... 713/1, 2
See application file for complete search history.

(56) References Cited

U.S. PATENT DOCUMENTS

| | | | | |
|---|---|---|---|---|
| 7,822,965 | B2* | 10/2010 | Li ....................... | G06F 11/1417 711/170 |
| 2003/0126511 | A1* | 7/2003 | Yang ..................... | G06F 9/4401 714/39 |
| 2005/0039081 | A1* | 2/2005 | Chang ................. | G06F 11/1417 714/36 |
| 2009/0259837 | A1* | 10/2009 | Wu ..................... | G06F 11/1456 713/2 |

* cited by examiner

*Primary Examiner* — Mark Connolly
(74) *Attorney, Agent, or Firm* — Zhigang Ma

(57) ABSTRACT

A booting system for a crashed motherboard includes a BIOS (Basic Input/Output System) chip, and a south bridge chip. The BIOS chip stores a plurality of boot procedures. The south bridge chip is coupled to the BIOS chip and includes a cache module. The cache module loads the plurality of boot procedures from the BIOS chip when the motherboard is powered on. When the motherboard crashes, the south bridge chip can load the plurality of boot procedures from the cache module to power on or repower the motherboard.

16 Claims, 2 Drawing Sheets

BOOTING SYSTEM FOR MOTHERBOARD

FIELD

The subject matter herein generally relates to motherboard booting.

BACKGROUND

A Basic Input/Output System (BIOS) chip is a program embedded by the manufacturer in a Read Only Memory (ROM) on a motherboard of a platform system such as a computer, a tablet or a smart phone. The BIOS is by definition a firmware on the motherboard and plays a role for communications between the hardware and an operating system. Operation of a platform system, including hardware adjustments, can be adjusted by means of the BIOS in which basic input/output programs related and essential to the platform, system information settings, Power On Self Test (POST), system bootstrap programs, etc. are stored. When a platform system is powered up, the BIOS performs a test on the platform system. After the test is completed, the operating system is loaded into a memory such as dynamic random access memory (DRAM). If the BIOS is damaged or fails in function due to, for example, a virus attack, the platform system will not boot successfully.

BRIEF DESCRIPTION OF THE DRAWINGS

Implementations of the present technology will now be described, by way of example only, with reference to the attached figures.

DETAILED DESCRIPTION

Figure 1:
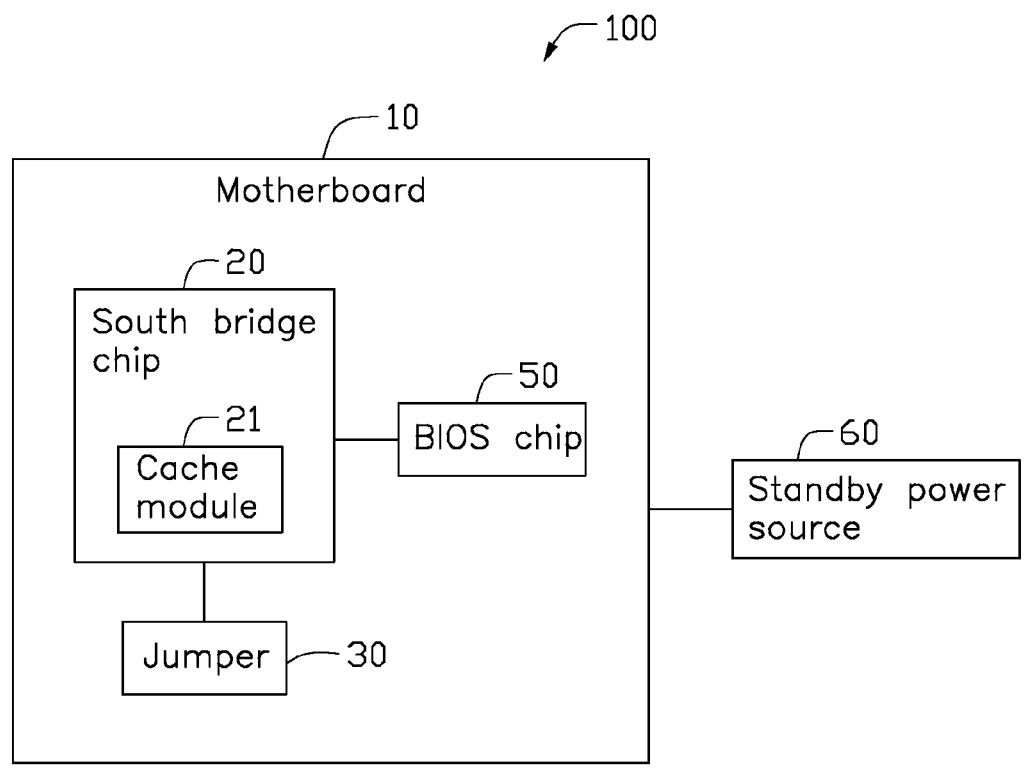
FIG. 1 is a block diagram of an example embodiment of a booting system for a motherboard.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure is described in relation to a booting system for a motherboard. The booting system includes a Basic Input/Output System (BIOS) chip, and a south bridge chip. The BIOS chip stores a plurality of boot procedures. The south bridge chip is coupled to the BIOS chip and includes a cache module. The cache module loads the plurality of boot procedures from the BIOS chip when the motherboard is powered on. When the motherboard crashes, the south bridge chip is configured to load the plurality of boot procedures in the cache module.

Figure 2:
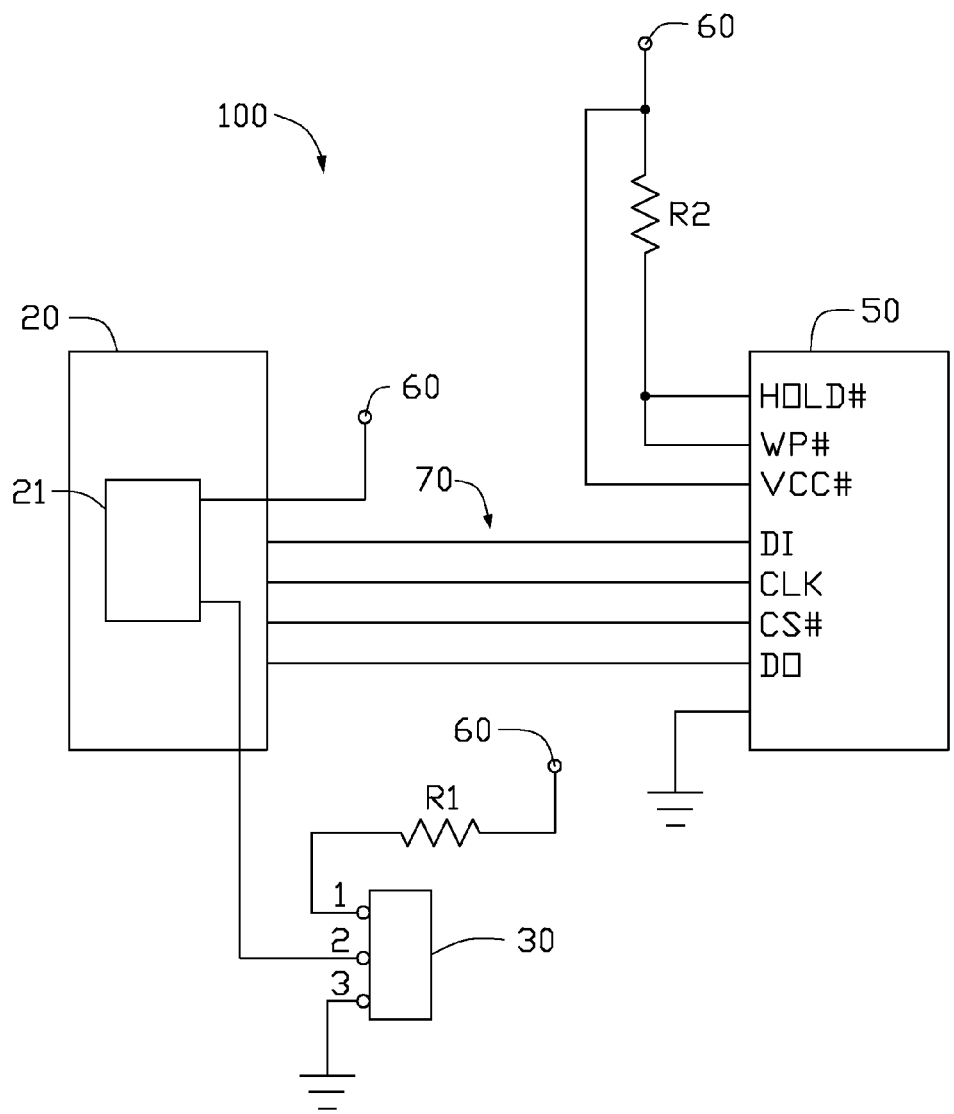
FIG. 2 is a circuit diagram of an example embodiment of the booting system of FIG. 1.

FIGS. 1-2 illustrate an embodiment of a booting system 100. The booting system 100 can include a motherboard 10, a south bridge chip 20 coupled to the motherboard 10, a jumper 30 coupled to the south bridge chip 20, a BIOS chip 50 coupled to the south bridge chip 20, and a standby power source 60. In at least one embodiment, a plurality of boot procedures can be stored in the BIOS chip 50, and the standby power source 60 can be P3V3_AUX, available to power the motherboard 10.

The south bridge chip 20 is coupled to the BIOS chip 30 by a Serial Peripheral Interface (SPI) bus 70. A cache module 21 can be coupled to the south bridge chip 20. A first terminal of the cache module 21 is coupled to the standby power source 60, and a second terminal of the cache module 21 is coupled to the jumper 30. In at least one embodiment, the cache module 21 can be a Random-Access Memory (RAM), which has a memory space equal to the memory space of the BIOS chip 30.

The jumper 30 can include a first terminal 1, a second terminal 2, a third terminal 3, and a first resistor R1. A first terminal of the first resistor R1 is coupled to the standby power source 60, and a second terminal of the first resistor R1 is coupled to the first terminal 1 of the jumper 30. The second terminal 2 is coupled to the cache module 21, and the third terminal 3 is grounded. In a default status, the second terminal 2 is coupled to the first terminal 1, thus when the standby power source 60 is powered on, the second terminal 2 outputs a high level signal to control the cache module 21 to load the plurality of boot procedures from the BIOS chip 50. If the second terminal 2 is coupled to the third terminal 3 when the standby power source 60 is powered on, the second terminal 2 outputs a low level signal, and the cache module 21 cannot load the plurality of boot procedures from the BIOS chip 50.

The BIOS chip 50 is grounded. A first terminal of a second resistor R2 is coupled to the standby power source 60, and a second terminal of the second resistor R2 is coupled to the BIOS chip 50.

In use, the standby power source 60 is powered on, the south bridge chip 20 load the plurality of boot procedures from the BIOS chip 50 enabling the motherboard 10 to power on. Simultaneously, the second terminal 2 outputs a high level signal to control the cache module 21 to load the plurality of boot procedures from the BIOS chip 50. If and when the motherboard 10 crashes, the south bridge chip 20 can load the plurality of boot procedures in the cache module 21 to power on or repower the motherboard 10.

The embodiments shown and described above are only examples. Many details are often found in the art such as the other features of a booting system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A booting system for a motherboard, comprising:
a Basic Input/Output System (BIOS) chip configured to store a plurality of boot procedures; and
a south bridge chip coupled to the BIOS chip and comprising a cache module, the cache module configured to load the plurality of boot procedures from the BIOS chip when the motherboard being powered on;
wherein the south bridge chip is configured such that in event the motherboard crashes, the south bridge chip loads the plurality of boot procedures in the cache module.

2. The booting system of claim 1, wherein the cache module comprises a memory space same as a memory space of the BIOS chip.

3. The booting system of claim 1, further comprising a standby power source, wherein the cache module is coupled to the standby power source.

4. The booting system of claim 3, further comprising a jumper, wherein the jumper comprises a first terminal, a second terminal, and a third terminal, the first terminal of the jumper is coupled to the standby power source, the second terminal of the jumper is coupled to the cache module, and the third terminal is grounded.

5. The booting system of claim 4, further comprising a first resistor, wherein the first resistor is coupled to the standby power source and the first terminal of the jumper.

6. The booting system of claim 1, wherein the cache module is a Random-Access Memory (RAM) chip.

7. The booting system of claim 1, further comprising a Serial Peripheral Interface (SPI) bus, wherein the south bridge chip is coupled to the BIOS chip by the SPI bus.

8. The booting system of claim 1, further comprising a standby power source and a second resistor, wherein the second resistor is coupled to the BIOS chip and the standby power source.

9. A booting system for a motherboard, comprising:
a Basic Input/Output System (BIOS) chip configured for storing a plurality of boot procedures;
a south bridge chip coupled to the BIOS chip and comprising a cache module; and
a jumper coupled to the south bridge chip;
wherein when the motherboard being powered on, the jumper is configured to output a high level signal to control the cache module to load the plurality of boot procedures from the BIOS chip; when the motherboard crashes, the south bridge chip is configured to load the plurality of boot procedures from the cache module.

10. The booting system of claim 9, wherein the cache module comprises a memory space same as a memory space of the BIOS chip.

11. The booting system of claim 9, further comprising a standby power source, wherein the cache module is coupled to the standby power source.

12. The booting system of claim 11, wherein the jumper comprises a first terminal, a second terminal, and a third terminal, the first terminal of the jumper is coupled to the standby power source, the second terminal of the jumper is coupled to the cache module, and the third terminal is grounded.

13. The booting system of claim 12, further comprising a first resistor, wherein the first resistor is coupled to the standby power source and the first terminal of the jumper.

14. The booting system of claim 9, wherein the cache module is a Random-Access Memory (RAM) chip.

15. The booting system of claim 9, further comprising a Serial Peripheral Interface (SPI) bus, wherein the south bridge chip is coupled to the BIOS chip by the SPI bus.

16. The booting system of claim 9, further comprising a standby power source and a second resistor, wherein the second resistor is coupled to the BIOS chip and the standby power source.

* * * * *